G. LANE AND G. J. CAMPBELL.
LIFTING JACK.
APPLICATION FILED FEB. 7, 1920.
1,372,521.
Patented Mar. 22, 1921.
2 SHEETS—SHEET 1.
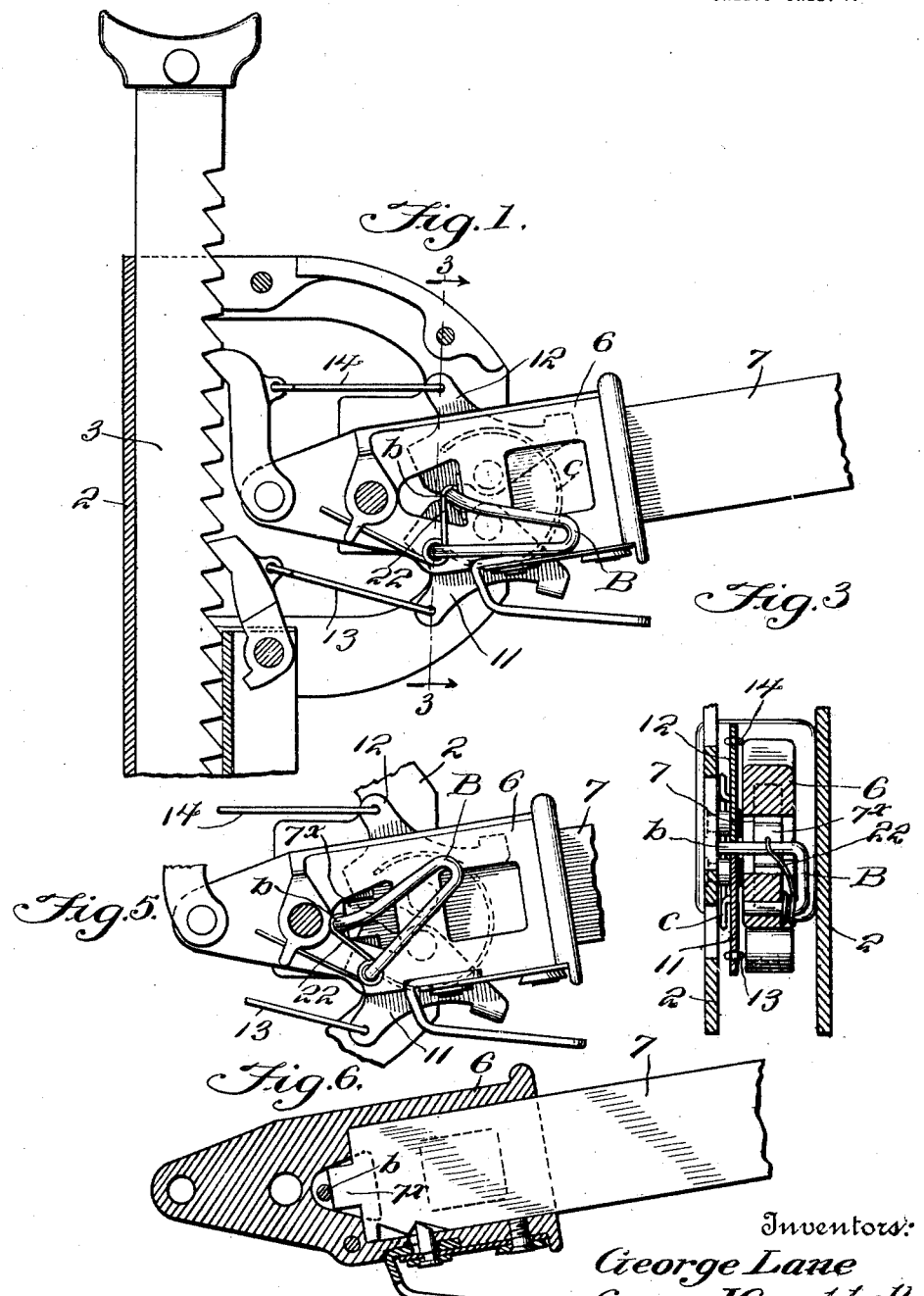
Inventors:
George Lane
George J. Campbell
By Spear, Middleton, Donaldson & Hall
Attorneys.

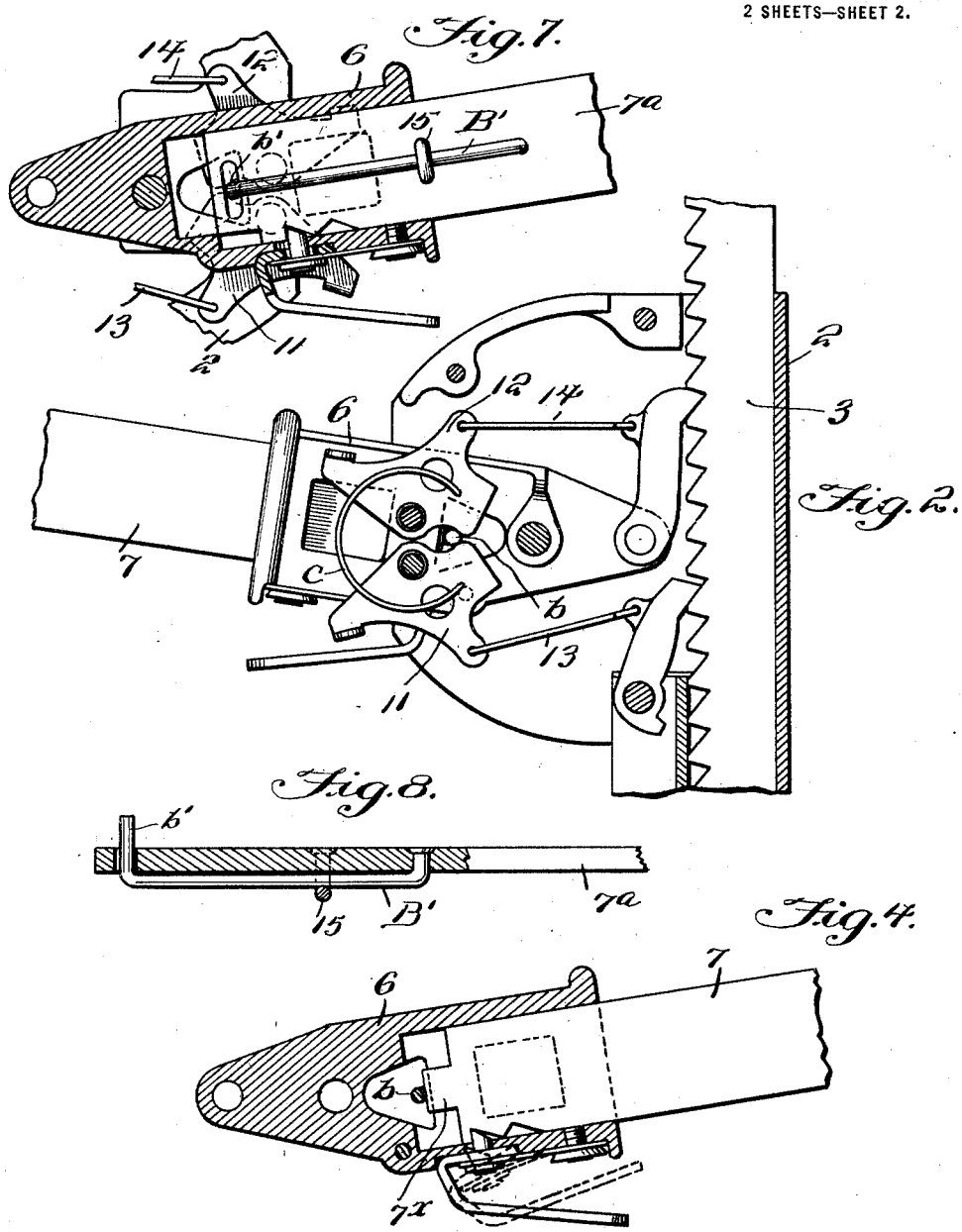

UNITED STATES PATENT OFFICE.

GEORGE LANE AND GEORGE J. CAMPBELL, OF POUGHKEEPSIE, NEW YORK, ASSIGNORS, BY DIRECT AND MESNE ASSIGNMENTS, TO LANE BROTHERS COMPANY, OF POUGHKEEPSIE, NEW YORK.

LIFTING-JACK.

1,372,521.

Specification of Letters Patent.    Patented Mar. 22, 1921.

Application filed February 7, 1920. Serial No. 356,858.

*To all whom it may concern:*

Be it known that we, GEORGE LANE and GEORGE J. CAMPBELL, citizens of the United States, and residents of the city of Poughkeepsie, State of New York, have invented certain new and useful Improvements in Lifting-Jacks, of which the following is a specification.

Our present invention relates to improvements in lifting jacks of the type shown for example in Letters Patent of the United States granted to Lane Brothers Company, as assignee of George Lane, Numbers 1,122,235, 1,181,395 and 1,320,244.

The invention aims to simplify the construction and make it more durable and efficient in use as will hereinafter appear, and the invention includes the novel features of construction and arrangement and combination of parts hereinafter described and particularly defined by the appended claims.

In order that the invention may be more readily understood we have appended hereto drawings illustrating the preferred embodiments of the invention in which:

Figure 1 is a sectional elevation of a sufficent portion of the jack to illustrate the invention.

Fig. 2 is a similar view of the opposite side.

Fig. 3 is a section on line 3—3 of Fig. 1.

Fig. 4 is a sectional detail showing the operating handle bar in lowering position.

Fig. 5 is a detail elevation.

Fig. 6 is a sectional detail showing the handle bar in raising position, and

Figs. 7 and 8 are sectional details of a modification.

Referring by reference characters to these drawings, the standard 2, lifting bar 3, and actuating or lifting and retaining dogs or pawls are shown as constructed and arranged to be operated substantially as in the aforesaid patents, said lifting and retaining dogs being connected with the bell crank levers 12 and 11 mounted alongside the actuating lever 6 and having their contact portions pressed toward each other by a common spring C.

In such prior constructions the connections between the bell crank levers and dogs were in the shape of close coiled springs which acted as compression links to transmit the thrust of the C spring to the dogs and hold them pressed yieldingly toward the lifting bar during the lifting operation, the dogs being pulled away from the lifting bar at the proper time by the action of the contact member $b$ striking the bell crank levers and rocking them alternately to impart tension to the springs.

We have found that these coiled springs sometimes give trouble in that they occasionally buckle and the loops thereof get out of place, or become disconnected.

To avoid this objection we substitute for the connecting springs of the former construction, rigid links as shown at 13 and 14.

We have found, however, that rigid links cannot be used without some compensating means, for if the motion of the actuating lever be against the bell crank lever connected with a dog or pawl under load, the dog cannot pull out of engagement with the rack while the load is upon it. To avoid this objection in a simple, economical, efficient and durable manner we make the contact member capable of yielding vertically when it strikes a bell crank lever, which permits the actuating lever to continue its movement until the load on the dog is relieved. One convenient method of accomplishing this is to support the contact member $b$ on the end of one arm of a contact carrying device B, the other arm of which is journaled in the actuating lever, and is acted upon by a spring 22 tending to rock it to keep the contact member normally pressed in one direction, for example, toward the operator, to bring the said contact member into position to engage the bell crank levers for lowering the lifting bar, as shown in Figs. 1 and 2.

For moving the contact member forward to clear the bell cranks, we may use either a shiftable handle bar, or a rigidly held handle bar with a longitudinally movable side rod as disclosed in the aforesaid patents. It will be understood that either one or both of the arms of the device B may be made sufficiently resilient to allow for the vertical yielding movement of the contact portion $b$ above described. The handle bar is indicated at 7 and it has a projection $7^\times$ designed to coöperate with and shift the contact member $b$.

Instead of carrying the contact device on the actuating lever it may be carried on the handle bar, and a convenient manner of accomplishing this is to provide the handle bar 7ᵃ, Figs. 7 and 8, with a spring rod B', having one end secured rigidly to the handle bar and the other end turned at right angles as indicated at b' and passed through a vertically elongated slot a' in the handle bar, this portion b' constituting the vertically yieldable contact member.

In this arrangement the handle bar is shiftable in the socket to alter the position of the contact portion to determine whether the jack shall rise or lower, though it is obvious that the handle bar might be rigidly held and the rod B' shifted relative thereto.

A staple 15 may be provided as additional holding means for the spring rod B'.

Having thus described our invention what we claim is:

1. In a lifting jack, a standard, a toothed lifting bar, an actuating lever pivotally mounted on the standard, a pair of pawls coöperating with the lifting bar, a member associated with each pawl and pivotally mounted on the standard, a link connection between each member and its pawl, means for yieldably pressing the pawls toward the bar, and a resilient part carried by the lever for engaging said members, said part being placed under tension when moved toward either of said members if the pawl associated with the latter is carrying the load, and moving under its tension to shift said member and carry the pawl associated therewith away from the bar upon the pawl being relieved of the load.

2. In a lifting jack, a standard, a toothed lifting bar, an actuating lever pivotally mounted on the standard, a pair of pawls coöperating with the lifting bar, a member associated with each pawl and pivotally mounted on the standard, a link connection between each member and its pawl, means for yieldably pressing the pawls toward the bar, and a resilient part carried by the lever for engaging said members, said part being placed under tension when moved toward either of said members if the pawl associated with the latter is carrying the load, and moving under its tension to shift said member and carry the pawl associated therewith away from the bar upon the pawl being relieved of the load, said part being shiftable into and out of coöperative relation with said members.

3. A lifting jack comprising a standard, a lifting member guided thereby, an actuating lever, a pair of actuating pawls coöperating with said lifting bar, a spring means for normally pressing said pawls into operative relation to the lifting bar, a rigid push and pull link or rod connected to each pawl, and means for actuating said rods, including a vertically yieldable member adapted to be shifted under tension and to shift under its tension to actuate said rods, said member movable longitudinally of the actuating lever.

4. A jack comprising a standard, a lifting bar, an actuating lever, pawls coöperating with said lifting bar, a pair of spring pressed bell crank levers pivotally supported from the standard and adapted to press said pawls toward the lifting bar, rigid links connecting said bell crank levers with the pawls, and a contact member movably carried by the actuating lever and having a vertically yieldable contact portion adapted to contact with said bell crank levers in one position of the contact device and to be ineffective as to said bell crank levers in another position of said device.

5. A jack comprising a standard, a lifting bar, an actuating lever, pawls coöperating with said lifting bar, a pair of spring pressed bell crank levers pivotally supported from the standard and adapted to press said pawls toward the lifting bar, rigid links connecting said bell crank levers with the pawls, and a contact member movably carried by the actuating lever and having a vertically yieldable contact portion adapted to contact with said bell crank levers in one position of the contact device and to be ineffective as to said bell crank levers in another position of said device, and a handle bar for said actuating lever carrying a part which is movable with respect to said actuating lever for determining the position of said contact device.

6. A jack comprising a standard, a lifting bar, an actuating lever, pawls coöperating with said lifting bar, a pair of spring pressed bell crank levers pivotally supported from the standard and adapted to press said pawls toward the lifting bar, rigid links connecting said bell crank levers with the pawls, a spring arm movably supported by the actuating lever having a transversely arranged vertically yieldable contact portion adapted to contact with said bell crank levers in one position of said device.

7. A jack comprising a standard, a lifting bar, an actuating lever, pawls coöperating with said lifting bar, a pair of spring pressed bell crank levers pivotally supported from the standard and adapted to press said pawls toward the lifting bar, rigid links connecting said bell crank levers with the pawls, a substantially U-shaped resilient member having one arm pivotally supported by said actuating lever and the other arm provided with a portion projecting between said bell crank levers, a spring tending to rock said U-shaped member in one direction, and a handle bar for said socket having a shiftable part adapted to rock said U-shaped member against the tension of its spring.

8. A jack comprising a standard, a lifting bar, an actuating lever, pawls coöperating with said lifting bar, a pair of spring pressed bell crank levers pivotally supported from the standard and adapted to press said pawls toward the lifting bar, rigid links connecting said bell crank levers with the pawls, an elongated, substantially U-shaped resilient member, lying in a plane parallel with said actuating lever and having one arm provided with an angularly turned portion pivotally supported by said actuating lever and the other arm provided with an angularly turned portion projecting between said bell crank levers, a spring tending to rock said U-shaped member in one direction, and a handle bar for said socket having a shiftable part adapted to rock said U-shaped member against the tension of its spring.

In testimony whereof, we affix our signatures.

GEORGE LANE.
GEO. J. CAMPBELL.